United States Patent [19]

Haze et al.

[11] Patent Number: 5,473,062

[45] Date of Patent: Dec. 5, 1995

[54] PROCESS FOR PRODUCING PURIFIED XANTHAN GUM

[75] Inventors: Akira Haze, Kawanishi; Kunihiro Ito, Takasago; Norio Okutani, Kobe, all of Japan

[73] Assignee: Takeda Chemical Industries, Ltd., Osaka, Japan

[21] Appl. No.: 143,117

[22] Filed: Oct. 29, 1993

[30] Foreign Application Priority Data

Oct. 29, 1992 [JP] Japan ............................. 4-291461

[51] Int. Cl.$^6$ ............................. C07H 1/06; C08B 37/00
[52] U.S. Cl. ..................... 536/114; 536/123.1; 536/127
[58] Field of Search ............................. 536/114, 127, 536/123.1

[56] References Cited

U.S. PATENT DOCUMENTS 3,964,972  6/1976  Patton ............................. 435/104
5,279,961  1/1994  Pollock et al. ............................. 435/320.1

FOREIGN PATENT DOCUMENTS 59-115301  7/1984  Japan.

OTHER PUBLICATIONS

J. Biochem. and Microbiol. Tech and Eng. III, 51–63 (1961).
Monthly Food Chemicals, 89, 123–136, Sep. 1992.

*Primary Examiner*—Chhaya D. Sayala
*Assistant Examiner*—Everett White
*Attorney, Agent, or Firm*—Wenderoth, Lind & Ponack

[57] ABSTRACT

There is disclosed a process for producing purified xanthan gum, which comprises (i) adding a hydrophilic organic solvent to an aqueous solution containing crude xanthan gum with pH 0.5 to 2.5, and (ii) neutralizing the mixture with a base to precipitate the xanthan gum. The xanthan gum thus obtained has low contents of ash and remaining organic solvent, as well as a high quality with little impurities, and can advantageously be used in the fields of foods, cosmetics, medicaments and the like.

3 Claims, No Drawings

PROCESS FOR PRODUCING PURIFIED XANTHAN GUM

FIELD OF THE INVENTION

The present invention relates to a process for producing purified xanthan gum which can be used as a thickener, stabilizing agent, additive or the like in the field of foods, cosmetics or medicaments.

BACKGROUND OF THE INVENTION

Xanthan gum is a kind of microbial polysaccharide produced by a microorganism, *Xanthomonas campestris* from carbohydrates such as starch, glucose, sucrose or the like. Xanthan gum is mainly composed of D-glucose, D-mannose, and sodium, potassium or calcium D-glucuronate. The main chain is composed of D-glucose joined to each other through β-1,4-linkage.

As methods for purifying or separating xanthan gum, for example, the following methods are known: the method wherein a fermentation solution of xanthan gum is adjusted to pH 5.6 and diluted with water, and then methanol is added, and an electrolyte such as KCl is added to precipitate xanthan gum (Journal of Biochemical and Microbiological Technology and Engineering, Vol. III, No. 1, pp. 51–63 (1961); "Monthly Food Chemicals", September, p. 124 (1992)); the method wherein an acid or alkali and methanol are added to a fermentation broth of xanthan gum and they are mixed, and the resulting precipitate is recovered (JP-A 59-115301).

In conventional purification and separation methods, a culture broth of xanthan gum is not easily handled because of its high viscosity. In the method wherein a culture broth of xanthan gum is diluted with water to decrease the viscosity, a relatively great amount organic solvent is required to precipitate xanthan gum, and production costs and equipment costs are high. Further, even when an acid and methanol are mixed with a culture broth of xanthan gum, the precipitate becomes gummy and it is difficult to recover and dehydrate xanthan gum from the precipitate. Furthermore, the xanthan gum obtained by these methods is not satisfactory because the ash content in the xanthan gum powder is high and too much organic solvent remains in the powder.

OBJECTS OF THE INVENTION

The main object of the present invention is to provide a novel process for producing purified xanthan gum.

This object as well as other objects and advantages of the present invention will become apparent to those skilled in the art from the following description.

SUMMARY OF THE INVENTION

According to the present invention, there is provided:
(1) A process for producing purified xanthan gum, which comprises (i) adding a hydrophilic organic solvent to an aqueous solution containing crude xanthan gum with pH 0.5 to 2.5, and (ii) neutralizing the mixture with a base to precipitate xanthan gum;
(2) A process according to the above (1), wherein the hydrophilic organic solvent is a lower alcohol;
(3) A process according to the above (2), wherein the lower alcohol is methanol;
(4) A process according to the above (1), wherein the concentration of xanthan gum in the aqueous solution containing crude xanthan gum is 0.5 to 4% w/v;
(5) A process according to the above (1), wherein the hydrophilic organic solvent is added so that the aqueous solution containing crude xanthan gum maintains the form of a solution;
(6) A process according to the above (1), wherein the hydrophilic organic solvent is added in a 1.5-fold to 6fold amount (v/v) based on the aqueous solution containing crude xanthan gum;
(7) A process according to the above (1), wherein the pH at the neutralization is 5 to 8; and
(8) A process for producing purified xanthan gum, comprising:
(i) providing an aqueous solution containing crude xanthan gum, the concentration of the crude xanthan gum in the aqueous solution being 0.5 to 4% w/v, the pH of the aqueous solution being 0.5 to 2.5;
(ii) adding a hydrophilic organic solvent to the aqueous solution containing the crude xanthan gum, the hydrophilic organic solvent being added in a 1.5-fold to 6-fold amount (v/v) based on the aqueous solution containing the crude xanthan gum, the hydrophilic organic solvent being added such that substantially all of the crude xanthan gum is maintained in solution; and
(iii) neutralizing the mixture with a base to precipitate purified xanthan gum, the pH at neutralization being 5 to 8.

DETAILED DESCRIPTION OF THE INVENTION

As the raw material of the aqueous solution containing crude xanthan gum with pH 0.5 to 2.5 to be used in the present invention, an aqueous solution of crude xanthan gum obtained by cultivating *Xanthomonas campestris* is preferably used. The resulting culture broth may be used as it is, or as a culture broth diluted with water. It may also be used after further adding unpurified xanthan gum. Furthermore, it may be used as a mixture of water and unpurified xanthan gum or xanthan gum imperfectly purified.

The aqueous solution containing crude xanthan gum can be prepared by known methods, for example, by the method of cultivating *Xanthomonas campestris* NRRL B-1459 described in the above "Monthly Food Chemicals", September, p. 122–124 (1992), or the like.

The aqueous solution containing crude xanthan gum is adjusted, by the addition of an acid, to pH about 0.5 to about 2.5, preferably about 0.5 to about 2, more preferably about 1 to about 2. When the aqueous solution has such a low pH, it has a low viscosity and can easily be stirred.

As the acid, there can be used, for example, inorganic acids such as hydrochloric acid, sulfuric acid, nitric acid, phosphoric acid or the like; and organic acids such as methanesulfonic acid or the like. Among them, inorganic acids are preferred. In particular, hydrochloric acid is preferred. Such acids may be diluted with water to a suitable concentration for use.

The concentration of xanthan gum in the aqueous solution containing crude xanthan gum with a pH adjusted to about 0.5 to about 2.5 is preferably about 0.5 to about 4% w/v, more preferably about 0.6 to about 3% w/v.

As the hydrophilic organic solvent in the invention, any organic solvent miscible with water can be used. It is preferably an organic solvent which is completely and homogeneously miscible with water. Examples thereof include lower alcohols having 1 to 3 carbon atoms such as methanol, ethanol, isopropyl alcohol or the like; ketones such as acetone; nitriles such as acetonitrile. Among them, lower alcohols are more preferred. In particular, methanol is preferred.

Preferably, the hydrophilic organic solvent is added in an appropriate amount to the aqueous solution so that the above aqueous solution of crude xanthan gum with pH about 0.5 to about 2.5 forms no precipitate and so that the gum is maintained in the solution. The solution may partly form precipitates.

The amount of the hydrophilic organic solvent to be added varies depending upon its kind. In the case of using a lower alcohol, for example, it is added in an about 1.5-fold to about 6-fold amount (v/v), preferably about 2-fold to about 4-fold amount (v/v) based on the aqueous solution containing crude xanthan gum.

The aqueous solution after adding the hydrophilic organic solvent is preferably maintained at about 15 to about 60° C. The above operation may be performed while mixing with a mixer such as propeller- or turbine-type stirrer or the like.

Further, if necessary, microbial cells may be removed by filtration, centrifugation or the like from the solution after adding the hydrophilic organic solvent.

Then, the aqueous solution after adding the hydrophilic organic solvent is neutralized by adding a base. Xanthan gum is thus precipitated. The pH at this neutralization is preferably about 3.2 to about 9, more preferably about 5 to about 8.

The kind of base is not specifically limited. Examples of the base include inorganic solvents. Among them, normally, there can preferably be used, for example, alkaline metal hydroxides (e.g., sodium hydroxide, potassium hydroxide, etc.), alkaline earth metal hydroxides (e.g., magnesium hydroxide, calcium hydroxide, etc.), alkaline metal bicarbonates (e.g., sodium bicarbonate, etc.), alkaline metal carbonates (e.g., sodium carbonate, potassium carbonate, etc.), aqueous ammonia, ammoniumhydroxide or the like. Among them, alkaline metal hydroxides (e.g., sodium hydroxide, potassium hydroxide, etc.) are more preferred.

The amount of the base to be used is so selected as to meet the desired final pH. The base may be used as it is or as an aqueous solution with an appropriate concentration.

When the aqueous solution containing a hydrophilic organic solvent is neutralized with a base, xanthan gum begins to precipitate at pH about 3.2. The fibrous precipitate of xanthan gum is thus obtained.

The above deposited xanthan gum is a slurry containing the deposited xanthan gum (xanthan gum slurry) which can easily be subjected to centrifugation, pressure filtration compression or the like.

From the viewpoint of industrial use, the above xanthan gum slurry is more advantageously used in the form of powder obtained after dehydration and drying. For example, the above xanthan gum slurry is subjected to known methods, centrifugation or compression (e.g., pressure filtration compression, etc.) or the like to obtain a dehydrate. The dehydrate is contacted with an organic solvent such as alcohol, acetone or the like for washing and dehydration, and then if necessary, dehydrated again to obtain a more dryable dehydrate (containing solid xanthan gum in an amount of about 20 to about 35% w/w). The resulting dehydrate is dried under reduced pressure, and then the resulting solid is pulverized to give dried powder.

When moisture-conditioned air (e.g., ca. 30° C.; relative humidity about 40–50%), for example, is used, if necessary, after drying of the above dehydrate, the amount of the organic solvent remaining in the desired dried powder can be further reduced.

The xanthan gum obtained in the present invention can be used in the fields of food, cosmetics, medicaments and the like. For example, when it is used in foods, it can be used as a thickener, stabilizing agent, quality preserving agent, agent for preventing oil separation. When it is used in cosmetics, it can be used as an additive (e.g., water or moisture retaining agent, etc.). When it is used in medicaments, it can be used as an additive.

As described hereinabove, according to the present invention, there is provided a novel process for producing purified xanthan gum. According to the process described in the present invention, an aqueous solution containing crude xanthan gum (e.g., a culture broth of xanthan gum) is easily handled because of its low viscosity. This process dose not require dilution of a culture broth of xanthan gum for easy handling. Further, the amount of an organic solvent required to deposit xanthan gum is less than that required in prior art methods. Further, purified xanthan gum powder can easily be obtained by dehydrating the precipitated purified xanthan gum. The dehydrate has a high solid content. Thus, the present invention is an industrially advantageous process which requires low production and equipment costs. Furthermore, xanthan gum obtained in the invention has low contents of ash and remaining organic solvents, as well as high quality with little impurities, and can advantageously be used in the fields of foods, cosmetics, medicaments and the like.

The following examples further illustrate the present invention in detail but are not to be construed to limit the scope thereof.

EXAMPLE 1

*Xanthomonas campestris* was cultivated in a 3 liter jar fermentor by using glucose as the carbon source by the known method described in the above "Monthly Food Chemical", September, p. 122–124 (1992) to obtain a culture broth of xanthan gum (about 2 liter). The pH of the culture broth was 6.7. The culture broth (2 liter) was adjusted to pH 1.5 by using 4N HCl (125 ml) with stirring. The concentration of xanthan gum in the culture broth after the pH adjustment was 2.75% w/v. The culture broth with pH 1.5 was divided into each 100 ml. Methanol was added to the culture broths in amounts of 0-fold (v/v)(i.e. without addition of methanol; control ), 1-fold (v/v)(i.e. 100 ml ), 2-fold (v/v)(i.e. 200 ml), 3-fold (v/v)(i.e. 300 ml ) and 4-fold (v/v)(i.e. 400 ml ) based on the broth, respectively. Each of the resulting mixtures was neutralized (pH 6.1) by adding 4N NaOH (each about 3.1 ml) to deposit xanthan gum. The deposited slurry was subjected to centrifugal dehydration using a small basket centrifuge ("Centrifugal filter SYK-3800-10A" manufactured by Sanyo Rikagaku Seisakusho Kabushiki Kaisha, Japan, using cotton filter cloth, rotating speed: 2400 rpm×320G), and further subjected to compression dehydration using a marketed potato masher. The xanthan gum dehydrate thus obtained was dried in vacuo (about 50° C. about 12 hours) and pulverized with a desk mill to give powdered xanthan gum.

Table 1 shows the viscosity of the culture broth relative to various amounts of methanol, the pH at which xanthan gum began to precipitate, the appearance of the precipitate, and the concentration of the solid in the resulting xanthan gum dehydrate.

TABLE 1

| Effect of the amount of methanol to be used | | | | | |
| --- | --- | --- | --- | --- | --- |
| Amount of added methanol based on culture broth (-fold (v/v)) | 0 | 1 | 2 | 3 | 4 |
| Viscosity of culture broth at adding methanol (cp) | 7370 | 1890 | 768 | 290 | 76 |
| pH at the beginning of precipitating | — | — | 3.5 | 3.3 | 3.2 |
| Appearance of precipitate | no precipitate | no precipitate | fibrous precipitate | fibrous precipitate | fibrous precipitate |
| Solid content in dehydrate (% w/w) | — | — | 30 | 27 | 25 |

As shown in Table 1, when methanol was added in 0-fold and 1-fold amounts (v/v) based on the culture broth with pH 1, xanthan gum did not deposit. On the other hand, when methanol was added in 2-fold, 3-fold and 4-fold amounts (v/v), the viscosity of the culture broths were low and they were easily handled and xanthan gum was precipitated in each case. The table shows that their dehydrates have high solid contents. Further, the deposits had fibrous appearances, and separation could readily be carried out.

Since the viscosity at adding methanol in a 2-fold (v/v) amount was low and 768 cp, the mixture is a solution which can easily be handled. For example, before deposition by neutralization with an alkali, filtration or the like for separating microbial cells can easily be carried out.

EXAMPLE 2

Methanol, ethanol, acetone and acetonitrile in amounts shown in Table 2 were added to the culture broths (each 100 ml, pH 1.5) obtained in Example 1, respectively. Then, xanthan gum powder was obtained according to the same procedure as in Example 1.

Properties of this powder were determined according to the same manner as in Example 1.

The results are shown in Table 2.

TABLE 2

| Effect of hydrophilic organic solvents | | | | |
| --- | --- | --- | --- | --- |
| Hydrophilic organic solvent | Methanol | Ethanol | Acetone | Acetonitrile |
| Amount of added hydrophilic solvent based on culture broth (-fold (v/v)) | 4 | 4 | 3 | 2 |
| Appearance of precipitate | fibrous precipitate | fibrous precipitate | fibrous precipitate | viscous precipitate |
| Solid content in dehydrate (% w/w) | 25 | 32 | 23 | 21 |

As shown in Table 2, when methanol or ethanol was used, a fibrous precipitate can be obtained and separation was easily accomplished. Further, their dehydrates have high solid contents. Methanol and ethanol are therefore suitable as the hydrophilic organic solvent. Likewise, acetone is also suitable as the hydrophilic organic solvent. In the case of acetonitrile, a precipitate similar to that in the case of methanol was obtained when the amount of acetonitrile was adjusted for the addition. Thus, acetonitrile is also suitable as the solvent.

EXAMPLE 3

A 4-fold amount (v/v)(i.e. 400 ml) of methanol was added to each of the culture broths (each 100 ml, pH 1.5) obtained in Example 1. Then, before neutralization with an alkali, the temperatures of the solutions were adjusted to 22° C., 35° C. and 50° C., respectively. Each of the solutions was allowed to stand for 30 minutes and was neutralized at each of the respective temperatures. Then, xanthan gum powder was obtained according to the same procedure as in Example 1.

Properties of this powder were determined according to the same manner as in Example 1. The results are shown in Table 3.

TABLE 3

| Effects of temperature at precipitation by neutralization | | | |
| --- | --- | --- | --- |
| Temperature at precipitation by neutralization (°C) | 22 | 35 | 50 |
| pH at the beginning of precipitation | 3.2 | 3.5 | 3.4 |
| Appearance of precipitate | fibrous precipitate | fibrous precipitate | fibrous precipitate |
| Solid content in dehydrate (% w/w) | 25 | 29 | 26 |

As shown in Table 3, in each case where temperature at deposition by neutralization is 22° C., 35° C. or 50° C., a fibrous deposit of xanthan gum was obtained and separation was easily accomplished. Further, their dehydrates have high solid contents.

EXAMPLE 4

Each of the culture broths (pH 1.5) obtained in Example 1 was diluted with water to give the concentrations of xanthan gum shown in Table 4. A 4-fold amount (v/v)(i.e. 400 ml) of methanol was added to each of the culture broths (each 100 ml, pH 1.5). Then, xanthan gum powder was obtained according to the same procedure as in Example 1.

Properties of this powder were determined according to the same manner as in Example 1. The results are shown in Table 4.

TABLE 4

| Effects of concentration of xanthan gum | | | |
| --- | --- | --- | --- |
| Concentration of xanthan gum (% w/v) | 2.75 | 1.38 | 0.69 |
| Water required for dilution (ml) | 0 | 50 | 75 |
| pH at the beginning of precipitation | 3.2 | 3.6 | 3.8 |
| Appearance of precipitate | fibrous precipitate | mass of short fibers | mass of short fibers |
| Solid content in dehydrate (% w/w) | 25 | 21 | 20 |

As shown in Table 4, in each case where the concentration of xanthan gum is 2.75% w/v, 1.38% w/v or 0.69% w/v, a fibrous precipitate of xanthan gum was obtained and separation was easily accomplished. Further, their dehydrates have high solid contents.

Judging from the solid content in the dehydrate and the ease of separation, when the concentration of xanthan gum was 2.75% w/v, particularly preferred results were obtained.

EXAMPLE 5

The culture broth was obtained according to the same manner as in Example 1. The culture broth was divided in equal parts (each 100 ml), and the resulting parts were adjusted with 4N HCl to pH 1.0, 1.5, 2.0, 2.5 and 3.0, respectively. Then, xanthan gum powder was obtained according to the same procedure as in Example 3.

Properties of this powder were determined according to the same manner as in Example 1. The results are shown in Table 5.

TABLE 5

| Effect of the culture broth pH adjusted with 4N HCl | | | | | |
|---|---|---|---|---|---|
| Culture broth pH after adding 4N HCl | 1.0 | 1.5 | 2.0 | 2.5 | 3.0 |
| pH at the beginning of precipitate | 3.2 | 3.2 | 3.2 | 3.2 | — |
| Appearance of precipitate | fibrous precipitate | fibrous precipitate | fibrous precipitate | fibrous precipitate | no precipitate |
| Solid content in dehydrate (% w/w) | 25 | 25 | 25 | 23 | — |

As shown in Table 5, when the culture broth was adjusted to pH 3.0, no xanthan gum was precipitated. On the other hand, when the culture broth was adjusted to pH not more than 2.5, fibrous precipitates were obtained. The table also shows that the separation of the precipitates is easily accomplished, and the dehydrates have high solid contents.

EXAMPLE 6

According to the same manner as in Example 1, methanol was added to each of the culture broths (each 100 ml), and then 4N NaOH was added thereto so that the pH's of the culture broths at completion of the xanthan gum deposition became 5.0, 6.1, 7.0 and 8.0, respectively. After deposition of xanthan gum, xanthan gum powder was obtained according to the same procedure as in Example 1.

Properties of this powder were determined. The results are shown in Table 6.

TABLE 6

| Effect of pH at the completion of deposition | | | | |
|---|---|---|---|---|
| pH at the completion of deposition | 5.0 | 6.1 | 7.0 | 8.0 |
| pH at the beginning of precipitation | 3.2 | 3.2 | 3.2 | 3.2 |
| Appearance of precipitate | fibrous precipitate | fibrous precipitate | fibrous precipitate | fibrous precipitate |
| Solid content in dehydrate (% w/w) | 24 | 25 | 25 | 24 |

As shown in Table 6, in each case where the pH after precipitation of xanthan gum was adjusted to 5 to 8, fibrous deposit was obtained, and the dehydrate had high solid contents. Thus, good results were obtained.

What is claimed is:

1. A process for producing purified xanthan gum, comprising:
    (i) providing an aqueous solution containing crude xanthan gum, the concentration of the crude xanthan gum in the aqueous solution being 0.5 to 4% w/v, the pH of the aqueous solution being 0.5 to 2.5;
    (ii) adding a hydrophilic organic solvent to the aqueous solution containing the crude xanthan gum, the hydrophilic organic solvent being added in a 1.5-fold to 6-fold amount (v/v) based on the aqueous solution containing the crude xanthan gum, the hydrophilic organic solvent being added such that substantially all of the crude xanthan gum is maintained in solution; and
    (iii) neutralizing the solution from step (ii) with a base to precipitate purified xanthan gum, the pH at neutralization being 5 to 8.

2. A process according to claim 1, wherein the hydrophilic organic solvent is a lower alcohol.

3. A process according to claim 2, wherein the lower alcohol is methanol.

* * * * *